United States Patent
Rohrmann et al.

(10) Patent No.: US 11,346,396 B2
(45) Date of Patent: May 31, 2022

(54) BEARING ASSEMBLY AND ADJUSTMENT SCREW FOR ADJUSTING THE BEARING CLEARANCE

(71) Applicant: Renk Aktiengesellschaft, Augsburg (DE)

(72) Inventors: Thorsten Rohrmann, Binder (DE); Lutz Winter, Laatzen (DE); Peter Decker, Hannover (DE)

(73) Assignee: RENK GMBH, Augsburg (DE)

(*) Notice: Subject to any disclaimer, the term of this patent is extended or adjusted under 35 U.S.C. 154(b) by 0 days.

(21) Appl. No.: 17/271,980

(22) PCT Filed: Aug. 1, 2019

(86) PCT No.: PCT/EP2019/070786
§ 371 (c)(1),
(2) Date: Feb. 26, 2021

(87) PCT Pub. No.: WO2020/043424
PCT Pub. Date: Mar. 5, 2020

(65) Prior Publication Data
US 2021/0341014 A1    Nov. 4, 2021

(30) Foreign Application Priority Data

Aug. 27, 2018    (DE) .................... 10 2018 120 808.1

(51) Int. Cl.
*F16C 25/02*    (2006.01)
*F16C 17/12*    (2006.01)
(Continued)

(52) U.S. Cl.
CPC .............. *F16C 25/02* (2013.01); *F03D 80/70* (2016.05); *F16C 17/12* (2013.01); *F16C 32/067* (2013.01);
(Continued)

(58) Field of Classification Search
CPC ........ F16C 17/03; F16C 17/035; F16C 17/06; F16C 17/065; F16C 17/12; F16C 25/02;
(Continued)

(56) References Cited

U.S. PATENT DOCUMENTS 9,488,229 B2 * 11/2016 Meier .................... F16C 33/043
10,626,922 B2 * 4/2020 Meier ..................... F16C 43/02
2017/0240389 A1 * 8/2017 Cunningham .......... F16C 33/26

FOREIGN PATENT DOCUMENTS

| EP | 2711569 | 3/2014 |
|----|---------|--------|
| EP | 3276192 | 1/2018 |
| WO | WO 2010070450 | 6/2010 |

OTHER PUBLICATIONS

International Search Report issued in corresponding PCT Application PCT/EP2019/070786.
(Continued)

*Primary Examiner* — James Pilkington
(74) *Attorney, Agent, or Firm* — Cozen O'Connor

(57) ABSTRACT

A bearing assembly for supporting a rotor in a fixed housing includes multiple slide bearing segments, each having a slide bearing body supported against a sliding surface. In the region of each slide bearing segment, the bearing clearance between the respective slide bearing body and the sliding surface is adjustable by an adjustment screw, each adjustment screw having an outer thread via which the screw can be screwed into a recess having an inner thread, each adjustment screw having a groove delimited on both sides by adjustment screw sections. A clamping screw extends through the adjustment screw sections and also through the groove, the adjustment screw sections can be clamped by the clamping screw, whereby each adjustment screw can be secured in the respective recess.

10 Claims, 2 Drawing Sheets

(51) Int. Cl.
 *F16C 32/06* (2006.01)
 *F03D 80/70* (2016.01)
(52) U.S. Cl.
 CPC ....... *F05B 2240/50* (2013.01); *F16C 2360/31* (2013.01)
(58) Field of Classification Search
 CPC ................ F16C 32/0666; F16C 32/067; F16C 32/0674; F16C 32/043
 See application file for complete search history.

(56) References Cited

OTHER PUBLICATIONS

Office Action dated Jun. 16, 2021 issued in India Patent Application No. 202147007768.
Office Action dated Jan. 27, 2022 issued in Australian Patent Application No. 2019331593.

\* cited by examiner

BEARING ASSEMBLY AND ADJUSTMENT SCREW FOR ADJUSTING THE BEARING CLEARANCE

CROSS REFERENCE TO RELATED APPLICATIONS

This is a U.S. national stage of International application No. PCT/EP2019/070786, filed on Aug. 1, 2019, which claims priority to German Application No. 10 2018 120 808.1, filed Aug. 27, 2018, the content of each of which is incorporated herein by reference.

BACKGROUND OF THE INVENTION

1. Field of the Invention

The invention relates to a bearing assembly. The invention, furthermore, relates to an adjusting screw for adjusting the bearing clearance.

2. Description of the Prior Art

Bearing assemblies having multiple bearing segments are known from practice. In particular, slide bearing assemblies are known which have multiple slide bearing segments. The slide bearing segments can be axial slide bearing segments or radial slide bearing segments. The slide bearing segments of a bearing assembly are preferentially fastened to the housing or alternatively to the rotor. Each slide bearing segment comprises a slide bearing body which supports itself on a sliding surface of a component section preferentially of the rotor or alternatively of the housing. Between the slide bearing body and the sliding surface a defined bearing clearance is required which, in bearing assemblies known from practice, can be adjusted by way of assembly shims. The adjustment of the bearing clearance by way of such assembly shims is cumbersome and therefore time-consuming. For this purpose, the bearing segments have to be often installed and removed in order to determine a correct thickness of the bearing shims.

There is a need for a bearing assembly in which the bearing clearance can be adjusted more easily. Starting out from this, the present invention is based on the object of creating a new type of bearing assembly and an adjusting screw for adjusting the bearing clearance.

This object is solved through a bearing assembly according to the invention that serves for mounting a rotor in a fixed housing. The bearing assembly comprises multiple slide bearing segments preferentially fastened to the housing, wherein each slide bearing segment comprises a slide bearing body which supports itself on a sliding surface of a component section preferentially of the rotor.

In the region of each slide bearing segment, a bearing clearance between the respective slide bearing body and the sliding surface of the respective component section, on which the slide bearing body supports itself, is adjustable by an adjusting screw.

The respective adjusting screw has an external thread, via which the adjusting screw can be screwed into a recess preferentially on the housing side, which has an internal thread. On the outer circumference, the respective adjusting screw comprises a groove that is axially limited on both sides by sections of the adjusting screw.

At least one clamping screw extends through the sections of the adjusting screw, which axially limit the groove of the adjusting screw, and thus also through the groove, via which clamping screw the sections of the adjusting screw which limit the groove of the adjusting screw, can be clamped as a result of which the respective adjusting screw can be locked in the respective recess.

In the bearing assembly according to an aspect of the invention, the bearing clearance is adjusted in the region of the respective slide bearing segment by a respective adjusting screw. By the at least one clamping screw, the respective adjusting screw can be clamped and thus locked. A simple adjustment of the bearing clearance is possible within a short time without the need of having to install and remove bearing bodies multiple times. The adjusting screw for adjusting the respective bearing clearance is locked in its position, namely by way of the at least one clamping screw interacting with the respective adjusting screw.

According to an advantageous further development of the invention, the respective clamping screw extends through bores in the sections of the respective adjusting screw, which axially limit the groove of the adjusting screw, wherein the bore on one of the sections is embodied as threadless through-bore and the bore on the other of the portions as threaded bore. This allows a particularly advantageous clamping of the respective adjusting screw in the recess receiving the respective adjusting screw.

According to an advantageous further development of the invention, the respective clamping screw extends through the sections of the adjusting screw which axially limit the groove of the adjusting screw, and in the region of the groove, exclusively through the groove spaced apart from a groove base of the groove. This, too, is advantageous for the advantageous clamping of the respective adjusting screw in the recess receiving the respective adjusting screw.

Preferred further developments of the invention are obtained from the following description.

BRIEF DESCRIPTION OF THE DRAWINGS

Exemplary embodiments of the invention are explained in more detail by way of the drawings without being restricted to this. In the drawings.

DETAILED DESCRIPTION OF THE PRESENTLY PREFERRED EMBODIMENTS

The invention relates to a bearing assembly for mounting a rotor in a fixed housing and to an adjusting screw for adjusting the bearing clearance.

The bearing assembly according to an aspect of the invention serves in particular for mounting a rotor of a wind turbine in a fixed housing of the wind turbine, namely for mounting a so-called main rotor of the wind turbine driven via the rotor blades.

Figure 1:
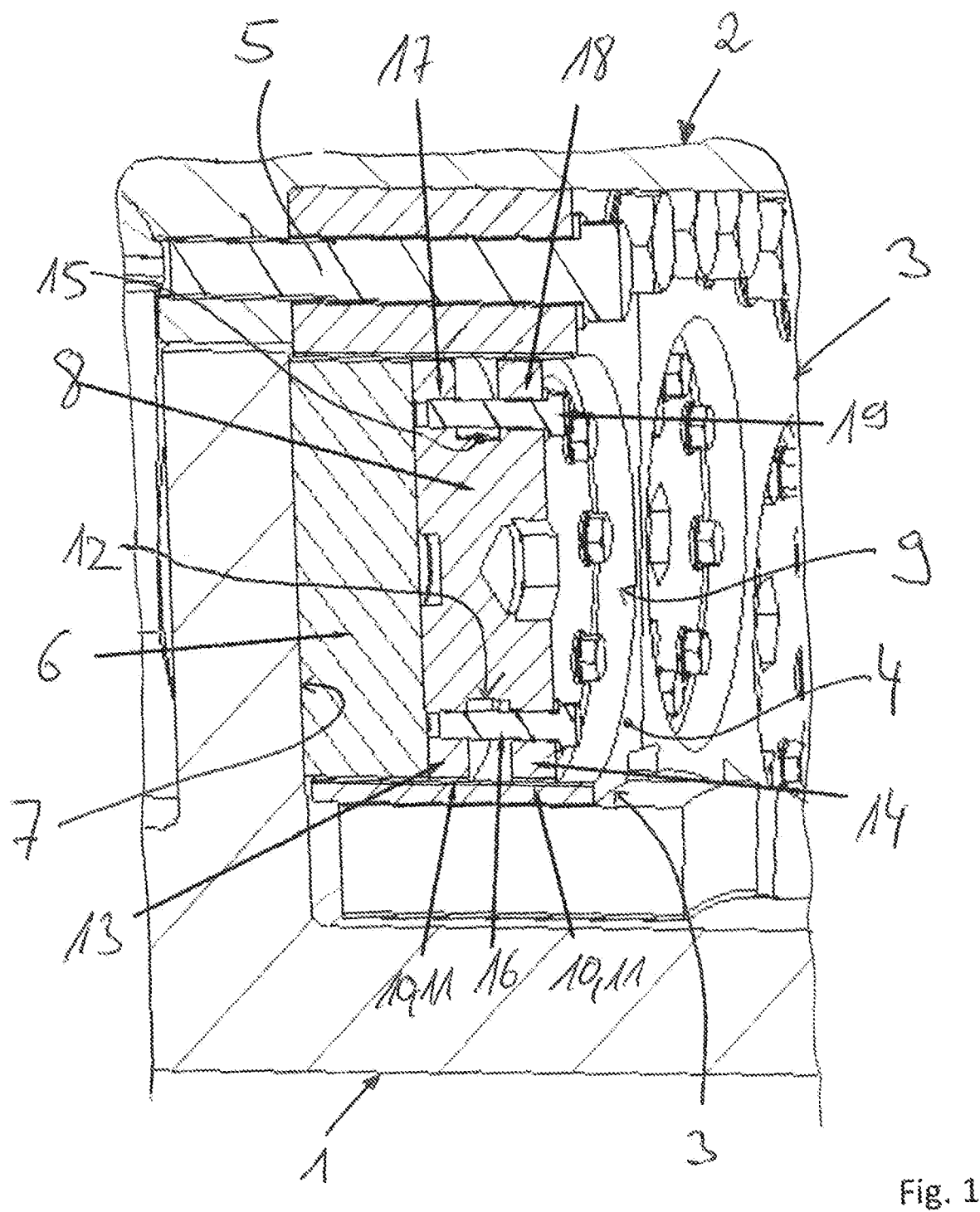
FIG. 1 is a cross section through a bearing assembly according to the invention.

FIG. 1 shows an extract from a bearing assembly which serves for mounting a rotor 1 in a housing 2.

The bearing assembly of FIG. 1 comprises multiple slide bearing segments 3 which, in the shown exemplary embodiment, are embodied as axial slide bearing segments. The invention is not restricted to axial slide bearing segments but can also be employed with radial slide bearing segments.

In the exemplary embodiment of FIG. 1, the slide bearing segments 3 are fastened to the housing 2, so that the slide bearing segments 3 of FIG. 1 are housing-side slide bearing segments. Each slide bearing segment 3 comprises a housing-side mounting 4, which is fastened to the housing 2 by at least one mounting screw 5 each. The respective mounting 4 accommodate a slide bearing body 6 which supports itself on a sliding surface 7 of the rotor 1.

In contrast with the shown exemplary embodiment it is possible that the slide bearing segment is a rotor-side slide bearing segment, which is fastened to the rotor 1, wherein the sliding body of the respective slide bearing segment then supports itself on a sliding surface of the housing.

For a proper operation of the bearing assembly it is important to adjust a bearing clearance in the region of the respective slide bearing segments 3, wherein the bearing clearance is defined by a gap between the respective slide bearing body 6 and the sliding surface 7, on which the slide bearing body 6 supports itself.

Adjusting screws 8 serve for adjusting this bearing clearance. In the region of each slide bearing segment 3, the respective bearing clearance between the respective slide bearing body 6 and the sliding surface 7, on which the slide bearing body 6 supports itself, is adjustable by way of at least one adjusting screw 8 each.

The respective adjusting screw 8 is received in a respective recess 9 of the mounting 4 of the respective slide bearing segment 3.

Here, the respective adjusting screw 8 has an external thread 10, which interacts with an internal thread 11 of the recess 9 receiving the respective adjusting screw 8. By way of the interaction of external thread 10 of the respective adjusting screw 8 and in the internal thread 11 of the respective recess 9, the adjusting screw 8 can be screwed into the recess 9 of the mounting 4 of the respective slide bearing segment 3 in order to thereby adjust the gap between the slide bearing body 6 and the sliding surface 7, on which the slide bearing body 6 supports itself.

Figure 2:
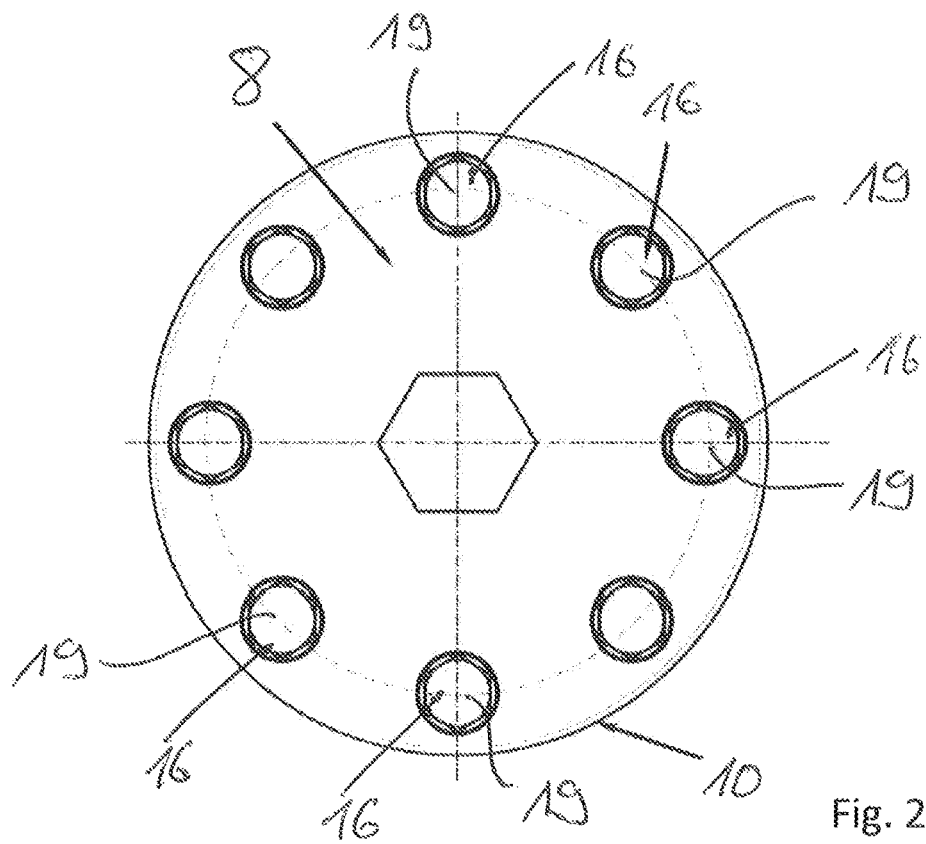
FIG. 2 is a detail of the bearing assembly, namely a bearing clearance adjusting screw, in front view.
Figure 3:
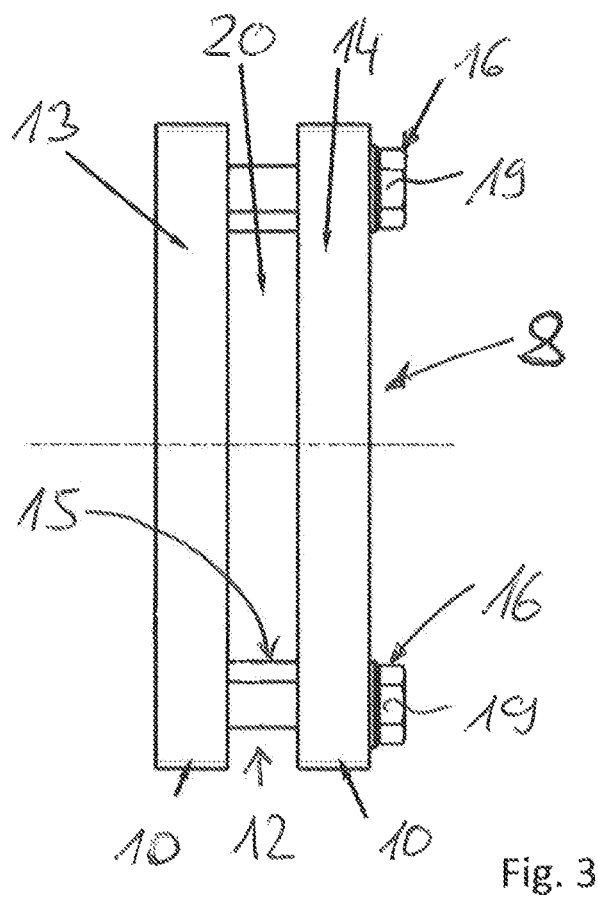
FIG. 3 is a detail of FIG. 2 in lateral view.

On its outer circumference, the respective adjusting screw 8 comprises a groove 12 which is axially limited on both sides by sections 13, 14 of the adjusting screw 8 which, with respect to the groove 12, protrude radially. Accordingly, the external thread 10 of the adjusting screw 8 is interrupted in the region of the groove 12. On both axial sides, the groove 12 of the adjusting screw 8 is limited by the sections 13 and of the adjusting screw 8. Inside, the groove 12 of the adjusting screw 8 is limited by a groove base 15 of the same. See also FIGS. 2 and 3.

At least one clamping screw 16 extends through the sections 13, 14 of the adjusting screw 8, which axially limit the groove 12 and thus also through the groove 12. Preferentially, for each adjusting screw 8 at least two, preferably at least four, particularly preferably at least six, such clamping screws 16 are present.

By way of the clamping screws 16, the sections 13, 14 of the adjusting screw 8, which axially limit the groove 12 of the same, can be clamped against one another, as a result of which the adjusting screw 8 is then locked in the respective recess 9 of the mounting 4 of the respective slide bearing 3 receiving the adjusting screw 8, which also receives the respective slide bearing body 6. The respective adjusting screw 8 can then no longer come loose unintentionally during the operation, but the same is rather locked in its position by the clamping screws 16.

A longitudinal center axis of the clamping screws 16 extends parallel to a longitudinal center axis of the respective adjusting screw 8. The respective clamping screws 16 extend through bores 17, 18 in the sections 13, 14 of the respective adjusting screw 8. These sections 13, 14 with the bores 17, 18 are again those sections that axially limit the groove 12. The respective clamping screw 16 extends through these sections 13, 14 of the adjusting screw 8, and in the region of the groove 12 exclusively through the groove 12 radially spaced apart from the groove base 15 of the groove 12.

The bores 17, 18 for the clamping screws 16 are embodied on one of the sections, namely in the shown exemplary embodiment of the section 17, of the adjusting screw 8, as a threaded bore and on the other section 14 of the adjusting screw 8 as a threadless through-bore.

Then, the respective clamping screw 16 does not have any external thread on the section that extends through the threadless through-bore but the respective clamping screw 16 rather has an external thread on that specific section that engages in the threaded bore. The respective clamping screw 16 supports itself with a screw head 19 on the respective adjusting screw 8, namely on an axial surface of the same.

With the invention, a bearing clearance can accordingly be easily and comfortably adjusted on a bearing assembly with slide bearing segments. To this end, at least one adjusting screw 8 is employed for each slide bearing segment 3, which adjusting screw 8 has an external thread 10 and which, via this external thread 10, can be screwed into a recess 9 in a mounting 4 of the respective slide bearing segment 3, on which a corresponding internal thread 11 is formed. Here, the adjusting screw 8 comprises on its outer circumferential surface the groove 12, which interrupts the external thread 10, and thus forms the two sections 13 and 14, which axially limit the groove 12. Inside, the groove 12 is limited by a groove base 15. The, or each, clamping screw 16 clamps the sections 13 and 14 of the clamping screw 8 to lock these from unintentionally coming loose. The respective clamping screw 16 extends exclusively through the sections 13 and 14, which axially limit the groove 12, however not through a middle section 20 of the adjusting screw positioned between the sections 13 and 14, which defines the groove base 15 of the groove 12.

For adjusting the bearing clearance, the adjusting screw 8 is thus screwed into a defined position in the respective recess 9 of the mounting 4 of the slide bearing segment 3. In the process, the flank clearance of the external thread 10 of the adjusting screw 8 is completely eliminated relative to the internal thread 11 of the recess 9 by tightening the clamping screws 16. Initially, the clamping screws are only tightened so far that flank clearance is eliminated but the adjusting screw 8 can still be turned. Thus it is prevented that the adjusted bearing clearance is influenced and superimposed by the flank clearance.

The bearing clearance is adjusted by further turning the adjusting screw 8. Once the bearing clearance has been adjusted, the clamping screws 16 are tightened with a defined nominal torque and thus the adjusting screw 8 finally locked in its position, so that the adjusting screw 8 can no longer turn.

If the flank clearance of the thread 10 were not eliminated, there would be the risk that the adjusted bearing clearance is changed by the clamping of the adjusting screw 8 in the order of magnitude of the flank clearance.

Although exemplary embodiments have been explained in the above description, it should be noted that numerous modifications are possible. Furthermore, it should be noted that the exemplary embodiments are merely examples which are not intended to limit the scope of protection, the applications and the structure in any way. Instead, the above description gives a person skilled in the art a guideline for the implementation of at least one exemplary embodiment, wherein various changes may be made, especially with regard to the function and arrangement of the component parts described, without departing from the scope of protection as apparent from the claims and combinations of features equivalent thereto.

The invention claimed is:

1. A bearing assembly for mounting a rotor (1) in a fixed housing (2), comprising:
    a plurality of slide bearing segments (3) fastenable to the fixed housing (2), wherein each slide bearing segment (3) comprises:
    a slide bearing body (6), which supports itself on a sliding surface (7) of a component section of the rotor (1);
    an adjusting screw (8);
    a bearing clearance arranged in a region of each of the plurality of slide bearing segments (3) between the respective slide bearing body (6) and the sliding surface (7) of the respective component section, on which the slide bearing body (6) supports itself, the bearing clearance being adjustable by the adjusting screw (8);
    a clamping screw (16) configured to extend through sections (13, 14) of the adjusting screw (8), which axially limit a groove (12) of the adjusting screw (8), and thus also through the groove (12), via which the sections (13, 14) of the adjusting screw (8), which axially limit the groove (12) of the adjusting screw (8), can be clamped, thereby locking the adjusting screw (8) in a recess (9); and
    wherein the adjusting screw (8) further comprises an external thread (10), via which the adjusting screw (8) can be screwed into the recess (9) on a housing side, the recess (9) comprising an internal thread (11), and wherein the adjusting screw (8) comprises the groove (12) on an outer circumference limited axially on both sides by the sections (13, 14) of the adjusting screw (8).

2. The bearing assembly according to claim 1, wherein multiple clamping screws (16) extend through the sections (13, 14) of the adjusting screw (8) and thus also through the groove (12).

3. The bearing assembly according to claim 2, wherein a longitudinal center axis of each respective clamping screw (16) extends parallel to a longitudinal center axis of the adjusting screw (8).

4. The bearing assembly according to claim 3, wherein each respective clamping screw (16) extends through bores (17, 18) in the sections (13, 14) of the adjusting screw (8), wherein the bore on one of the sections of the adjusting screw (8) is configured as a threadless through-bore and the bore on the section of the adjusting screw (8) is configured as a threaded bore.

5. The bearing assembly according to claim 4, wherein the respective clamping screw (16) extends through the sections (13, 14) of the adjusting screw (8) and extends through a region of the groove (12) that is spaced apart from a groove base (15) of the groove (12).

6. An adjusting screw (8) for adjusting a bearing clearance in a region of each of a plurality of slide bearing segments of a bearing assembly for mounting a rotor (1) in a fixed housing (2), the adjusting screw (8) comprising:
    an external thread (10);
    a groove (12) arranged on the outer circumference, which is axially limited on both sides by sections (13, 14) of the adjusting screw (8); and
    a clamping screw (16) configured to extend through the sections (13, 14) of the adjusting screw (8), which axially limits the groove (12) of the adjusting screw (8), and thus also through the groove (12), via which the sections (13, 14) of the adjusting screw (8), which axially limit the groove (12) of the adjusting screw (8), can be clamped, thereby locking the adjusting screw (8) in a recess (9) on the housing side.

7. The adjusting screw according to claim 6, wherein multiple clamping screws (16) extend through the sections (13, 14) of the adjusting screw (8) and thus also through the groove (12).

8. The adjusting screw according to claim 7, wherein a longitudinal center axis of each respective clamping screw (16) extends parallel to a longitudinal center axis of the adjusting screw (8).

9. The adjusting screw according to claim 8, wherein each respective clamping screw (16) extends through bores (17, 18) in the sections (13, 14) of the adjusting screw (8), wherein the bore on one of the sections of the adjusting screw (8) is configured as a threadless through-bore and the bore on the section of the adjusting screw (8) is configured as a threaded bore.

10. The adjusting screw according to claim 9, wherein the respective clamping screw (16) extends through the sections (13, 14) of the adjusting screw (8) and extends through a region of the groove (12) that is spaced apart from a groove base (15) of the groove (12).

* * * * *